(12) United States Patent
Mihaylov et al.

(10) Patent No.: US 9,736,694 B2
(45) Date of Patent: *Aug. 15, 2017

(54) AUTHORIZATION BASED ON ACCESS TOKEN

(71) Applicant: SAP SE, Walldorf (DE)

(72) Inventors: Yanislav Mihaylov, Sofia (BG); Plamen Pavlov, Pleven (BG)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/208,489

(22) Filed: Jul. 12, 2016

(65) Prior Publication Data

US 2016/0366592 A1    Dec. 15, 2016

Related U.S. Application Data

(63) Continuation of application No. 14/501,412, filed on Sep. 30, 2014, now Pat. No. 9,420,463.

(51) Int. Cl.
*H04L 29/06* (2006.01)
*H04W 12/08* (2009.01)
*H04W 12/06* (2009.01)

(52) U.S. Cl.
CPC ........... *H04W 12/08* (2013.01); *H04L 63/08* (2013.01); *H04L 63/0807* (2013.01); *H04L 63/10* (2013.01); *H04W 12/06* (2013.01); *H04L 2463/121* (2013.01)

(58) Field of Classification Search
CPC .......................... H04L 63/08; H04L 63/0807
See application file for complete search history.

(56) References Cited

U.S. PATENT DOCUMENTS

| | | | | |
|---|---|---|---|---|
| 8,549,293 B2* | 10/2013 | Hahn | ..................... | H04W 12/06 455/552.1 |
| 8,925,044 B2* | 12/2014 | Woodward | .............. | H04W 8/02 455/433 |
| 8,989,053 B1* | 3/2015 | Skaaksrud | ............ | H04W 12/06 370/255 |
| 9,560,047 B1* | 1/2017 | Long | ...................... | H04W 12/08 |
| 2007/0066280 A1* | 3/2007 | Arai | ......................... | H04L 63/10 455/411 |
| 2012/0054486 A1* | 3/2012 | Lakkavalli | .............. | G06F 21/57 713/156 |
| 2012/0136796 A1* | 5/2012 | Hammad | ............... | G06Q 20/12 705/67 |
| 2013/0198817 A1* | 8/2013 | Haddad | ................... | H04L 63/18 726/5 |
| 2014/0007205 A1* | 1/2014 | Oikonomou | ............ | G06F 21/35 726/6 |

(Continued)

*Primary Examiner* — Ali Shayanfar
(74) *Attorney, Agent, or Firm* — Jones Day

(57) ABSTRACT

A mobile device may include an authenticator and a processor. The authenticator may generate an authorization request with a secure token to access a server. The processor may access the server using an authorization token, if the authenticator receives the authorization token in response to the authorization request. The authenticator may embed the authorization request with a plurality of parameters to allow the server to determine, based upon at least one of the plurality of parameters, if the authorization token should be given to the mobile device.

15 Claims, 6 Drawing Sheets

(56) References Cited

U.S. PATENT DOCUMENTS

| | | | | |
|---|---|---|---|---|
| 2014/0130145 A1* | 5/2014 | Yeleswarapu | ........... | H04L 61/30 |
| | | | | 726/9 |
| 2014/0245403 A1* | 8/2014 | Li | ........................... | H04L 12/66 |
| | | | | 726/4 |
| 2014/0289839 A1* | 9/2014 | Chen | ................... | H04L 63/0807 |
| | | | | 726/9 |
| 2014/0304837 A1* | 10/2014 | Mogaki | ................... | G06F 21/33 |
| | | | | 726/28 |
| 2015/0089623 A1* | 3/2015 | Sondhi | .................... | H04L 63/08 |
| | | | | 726/9 |
| 2015/0140964 A1* | 5/2015 | Horton | ................. | H04W 12/08 |
| | | | | 455/410 |

* cited by examiner

AUTHORIZATION BASED ON ACCESS TOKEN

CROSS-REFERENCE TO RELATED APPLICATION

The present application is a divisional of, and claims priority to, U.S. patent application Ser. No. 14/501,412, filed on Sep. 30, 2014, which is herein incorporated by reference in its entirety.

FIELD

The present invention relates generally to user authentication on a mobile device to request access from various servers in a network environment.

BACKGROUND

As mobile solutions and mobile applications become increasingly complex, so do security protocols and user authentication protocols. As mobile devices are increasingly shared via schemes as "bring your own device" or BYOD in the work environment, users with different security access levels may wish to access work data on their own mobile devices, using many different non-secure applications/programs, or $3^{rd}$ party apps. To provide such accesses from many different users on different mobile devices with different $3^{rd}$ party apps, the user authentication system may become burdensome, and access request schemes may be too complex and difficult to use for portability with most $3^{rd}$ party apps.

Thus, there is a need to have devices or systems that can handle authentication with different users on different mobile devices with different $3^{rd}$ party apps efficiently without significant complexity to programs/applications on the mobile device.

BRIEF DESCRIPTION OF THE DRAWINGS

FIGS. 4A and 4B illustrate an exemplary user interface and process for defining client usage scope according to an embodiment.

DETAILED DESCRIPTION

Figure 1:
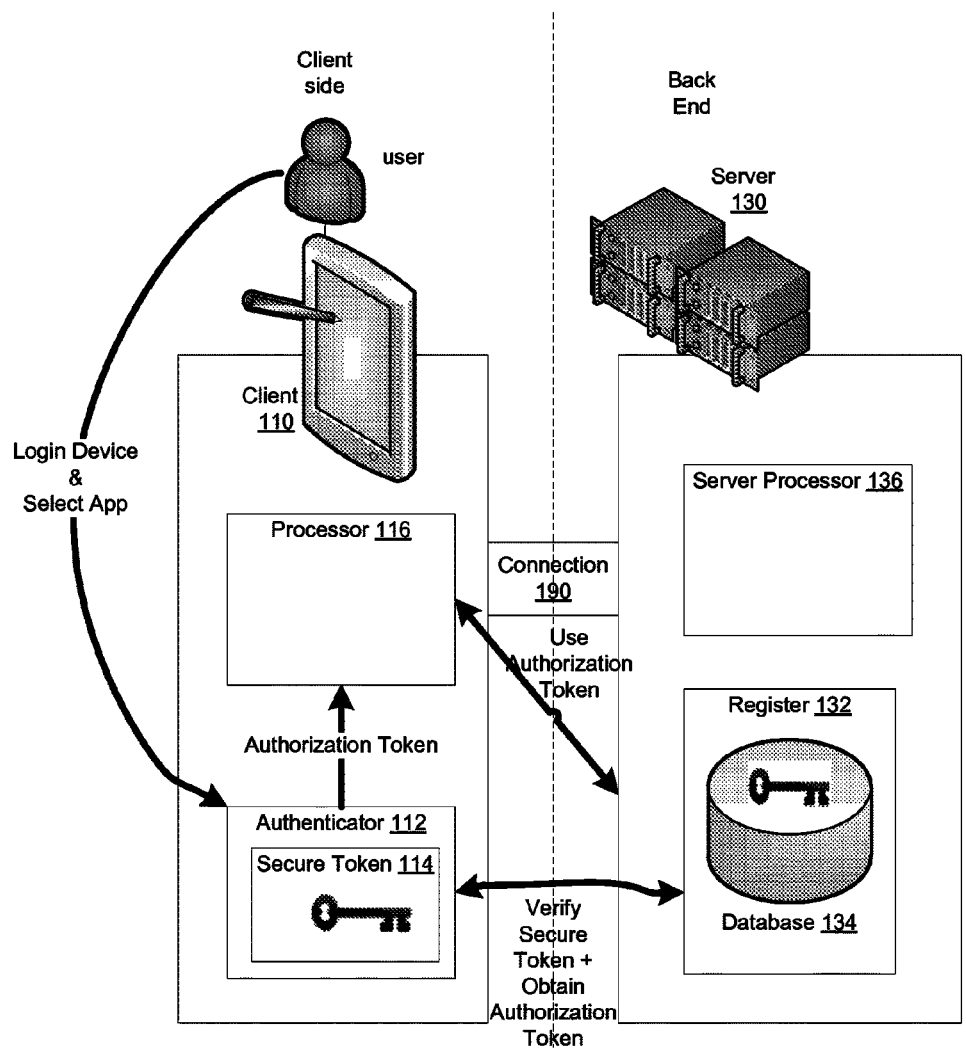
FIG. 1 illustrates an exemplary mobile device in a communication network according to an embodiment.

FIG. 1 illustrates an exemplary mobile device 110 in a communication network 100 according to an embodiment.

According to an embodiment, in a network 100, a client/mobile device 110 on the client side may include an authenticator 112, which may generate and/or store a secure token 114 (e.g., a segment of data or alpha-numerical sequence), and a processor 116 configured to execute one or more programs/applications (third party applications, or $3^{rd}$ party apps) that requests access from the servers 130. On the back end side, servers 130 may include a register 132 storing profiles of mobile clients with respective secure tokens in a database 134, the plurality of tokens associated with a plurality of profiles, and a server processor 136 for processing data requests from the mobile device 110 and other server functions.

The servers 130 may be a cluster of servers in the same local network, or in different local networks. The client 110 may communicate with the servers 130 via a connection 190. The authenticator 112 may store profiles with tokens each corresponding to specific tokens and/or profiles stored in the register 132 on the servers 130.

On the mobile device 110, the authenticator 112 may register individual programs and applications that are specifically allowed to interface with the authenticator 112 to receive keys/tokens to be used for requesting access by the programs and applications from the servers 130. The authenticator 112 on the mobile device 110 may create user profiles for different individual users, and/or different profiles for specific data repositories or servers that the user registered access authentication for. In doing so, different authentication register 132 may be handled by the authenticator 112 for different users.

FIG. 1 illustrates an exemplary user authentication for the mobile device 110 to request access from the servers 130.

During authentication, the user may initiate the authenticator 112 by logging in on the mobile device 110. The mobile device 110 and/or the authenticator 112 may request the user for initial authentication via a password or a pin as a first step. The user may select a program or application to be executed in the processor 116 on the mobile device 110, to request access to at least one of the data repositories associated with the register 132 and the servers 130.

The authenticator 112 may generate an authorization request with a secure token 114 to access the server 130. The authenticator 112 may embed the authorization request with a plurality of parameters to allow the server 130 to determine, based upon at least one of the plurality of parameters, if the authorization token should be given to the mobile device 110. The processor 116 may access the server 130 using an authorization token, if the authenticator 112 receives the authorization token in response to the authorization request.

Based upon the user's own login identification information (such as a username, or an email address, etc.), as well as other parameter information (such as which $3^{rd}$ party app is selected, data repository, requested data portion, requested data function, etc.) on the mobile device 110, the authenticator 112 may form the authorization request by embedding the authorization request with the secure token 114 (for the appropriate server 130) and a plurality of parameters. The parameters may include information generated by the user's selections in the program or application executing in the processor 116. Some of the parameters may be collectively associated with "scope" of usage.

In this fashion, the secure token 114 used by the mobile device 110 need not be modified to include additional complex data structure.

The tokens (secure or authorization) may be generated based partly on the secret, and partly on a temporary number that's common to the mobile device 110 and the server 130, for example, the web session ID number or a time-stamp associated with the request for access. The key/token may be generated using a predetermined algorithm using the secret, such as a symmetric key algorithm, a RSA algorithm, a AES algorithm, a DES algorithm, etc.

The register 132 in the server 130 may handle the authorization request from the mobile device 110. The register 132 may parse out the authorization request into the secure token and the parameters for verification.

The server processor 136 may compare or match the secure token and the parameters in the authorization request to the profile information stored in the database 134. This comparing or matching may be done by for example, (1) checking if the specific mobile client device 110 and the $3^{rd}$ party application are registered in any of the profiles in the database 134, (2) checking if the secure token corresponds to the requesting mobile client device 110 and the $3^{rd}$ party application in the profile information, (3) checking if the secure token received is still valid, (4) checking to see if the requested "scope" of usage from the mobile device 110 is within the defined security level for the specific requesting mobile client device 110 and the $3^{rd}$ party application. If any of the conditions (1)-(4) fails the checking by the register 132, the register 132 may decline to send an authorization token back to the mobile device 110, and/or send notification to the mobile device 110 as appropriate.

The authorization token may be a temporary (or one-time) token generated by the register 132, specific for the mobile client 110 and the $3^{rd}$ party application requesting the authorization. The authorization token may be sent to the mobile device 110 with a renewal token. Additionally, another authorization token for a different $3^{rd}$ party application may be sent to the mobile device 110, based upon validation of the secure token and the requested scope, if the requested scope is for access authorization of the different $3^{rd}$ party application. The renewal token may be later used by the mobile device 110 to renew its authorization token, such that a previously authorized mobile device 110 and the $3^{rd}$ party application (with the same usage "scope") combination would not require another authentication through the authenticator, and the $3^{rd}$ party application under such circumstances would only need to request a renewal of the authorization token by sending a request directly to the register 132 with the renewal token to obtain a new authorization token.

If a mobile device is stolen or lost then it only has to be unregistered from the backend system. This step may be sufficient because it does not contain the actual password of the user for the backend system. Shared mobile devices can be supported by having user profiles in the authenticator app.

Figure 2:
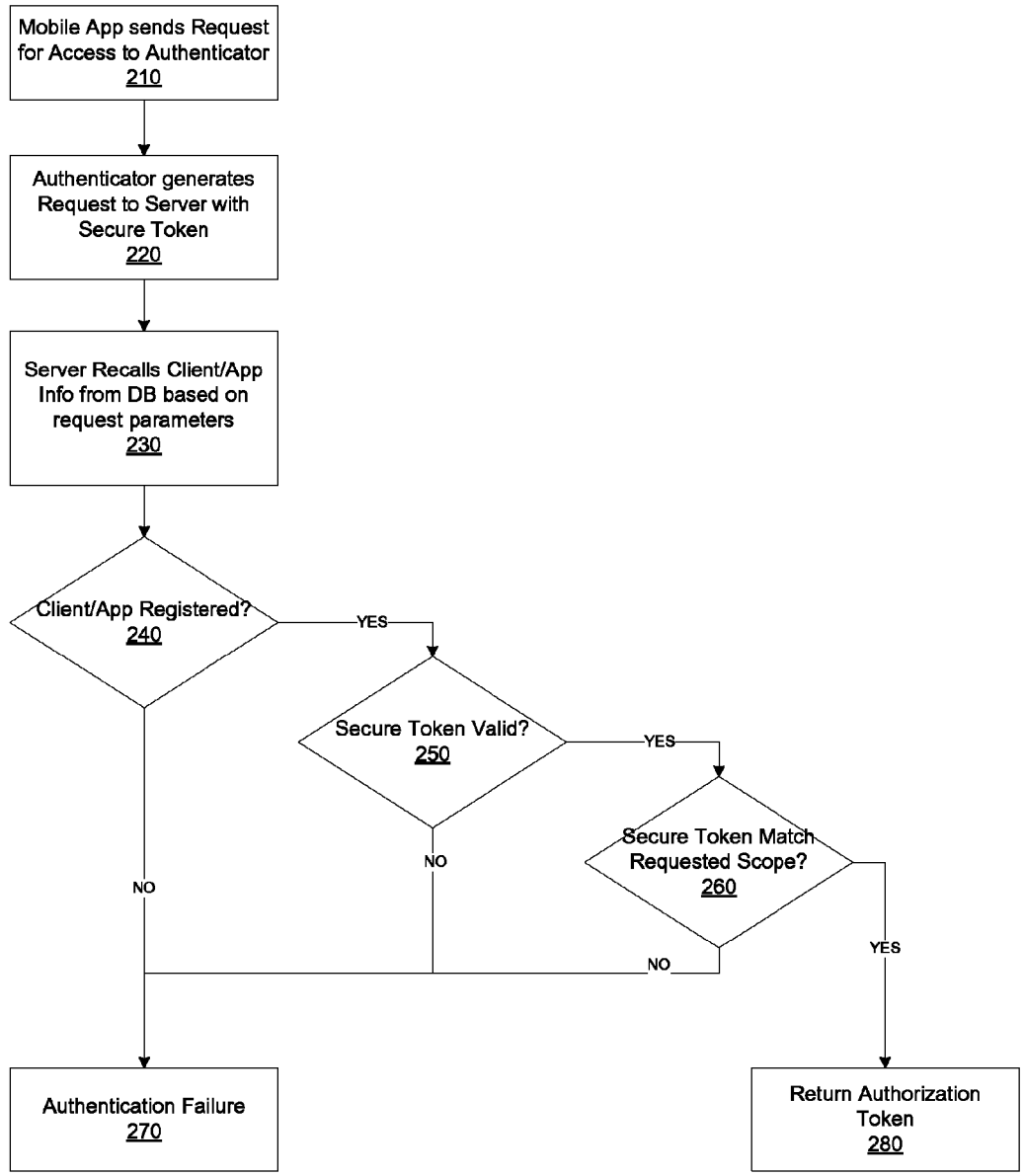
FIG. 2 illustrates an exemplary process according to an embodiment.

FIG. 2 illustrates an exemplary process 200 for authenticating the client device 110, according to an embodiment.

Figure 3:
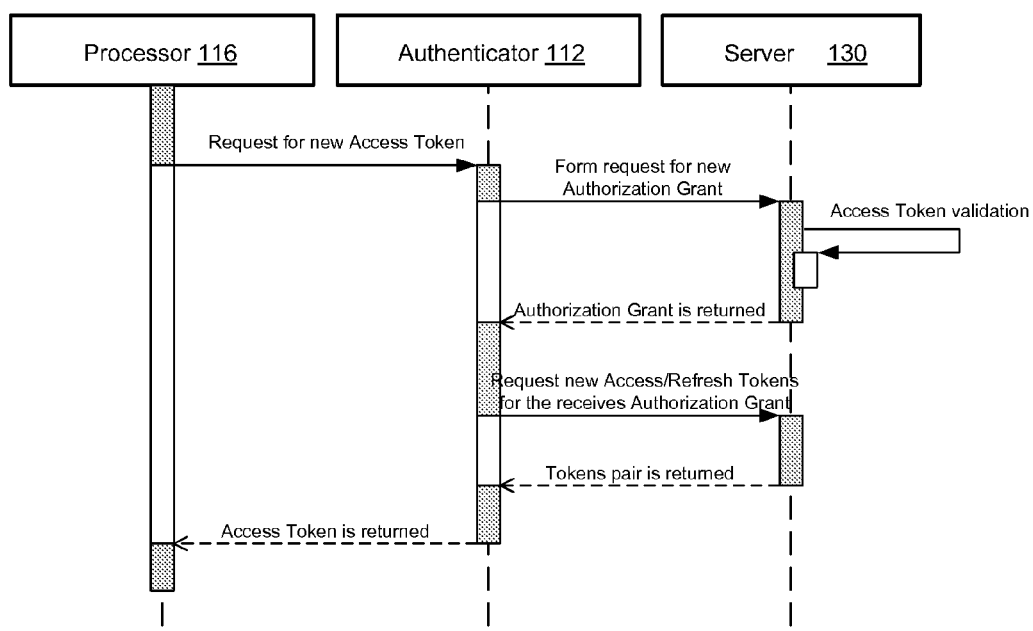
FIG. 3 illustrates an exemplary process according to an embodiment.

FIG. 3 illustrates a similar exemplary process 300 for authenticating the client device 110, illustrated in hardware data flow format, according to an embodiment.

According to an embodiment, at 210, the process 200 may begin with the user logging onto the mobile device 110, select a $3^{rd}$ party app to be executed in the processor 116, and select other parameters for the request to the server. The parameters may also include the user's login identification information. The $3^{rd}$ party app may send relevant information as request for authorization to the authenticator 112.

At 220, the authenticator 112 may generate a request for authorization, embedded with an appropriately selected secure token that corresponds to the $3^{rd}$ party app, and also embedded with parameter information.

At 230, the register 132 may receive and parse the request for authorization from the authenticator 112, and then the server processor 136 may compare the request for authorization with profile information stored in the database 134.

At 240, the server processor 136 may check if the specific mobile client device 110 and the $3^{rd}$ party application are registered in any of the profiles in the database 134. If not, the authorization fails at 270.

At 250, the server processor 136 may check if the secure token corresponds to the requesting mobile client device 110 and the $3^{rd}$ party application in the profile information, and/or if the secure token received is still valid. If not, the authorization fails at 270.

At 260, the server processor 136 may check if the requested "scope" of usage from the mobile device 110 is within the defined security level for the specific requesting mobile client device 110 and the $3^{rd}$ party application. If not, the authorization fails at 270.

At 270, the authorization fails.

At 280, if the authentication is successful in 240-260, then the register 132 may generate an authorization token (and the renewal token) to be sent to the authenticator 112, which then may pass the authorization token (and the renewal token) to the processor 116 and the $3^{rd}$ party app to allow access to the server 130.

Having the previous step completed, the 3rd party app on mobile device 110 may have a valid authorization token, which could be used for reaching protected resources/data within the "scope" of usage from server 130.

The server 130 may be in communication with configured Clients (SSO Client, Client1, Client2, . . . , ClientN), and configured scopes (Scope1, Scope2, . . . , ScopeM). The various scopes may include data deletion, data modification, data read, data write, data query, etc., as well as specific functions, or specific webpages.

A scope may be assigned/associated to a specific $3^{rd}$ party app on a specific mobile device, and the scope may be configured and stored in association to a specific profile associated with the specific $3^{rd}$ party app of a specific mobile device. An authorization token may be issued if a valid pair of ($3^{rd}$ party app-Scope) is provided as parameters embedded in a request for authorization.

Figure 4A:
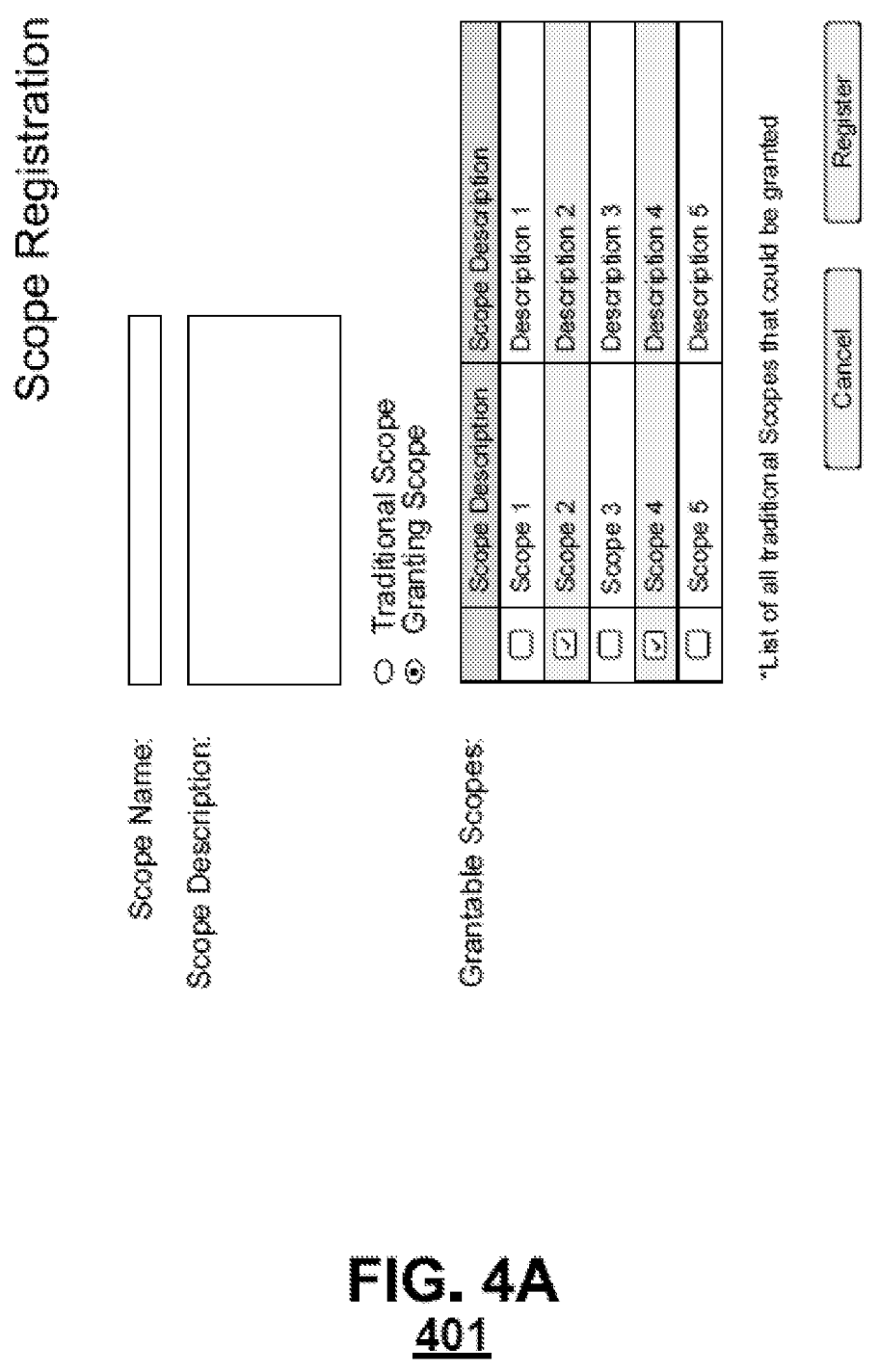
Figure 4B:
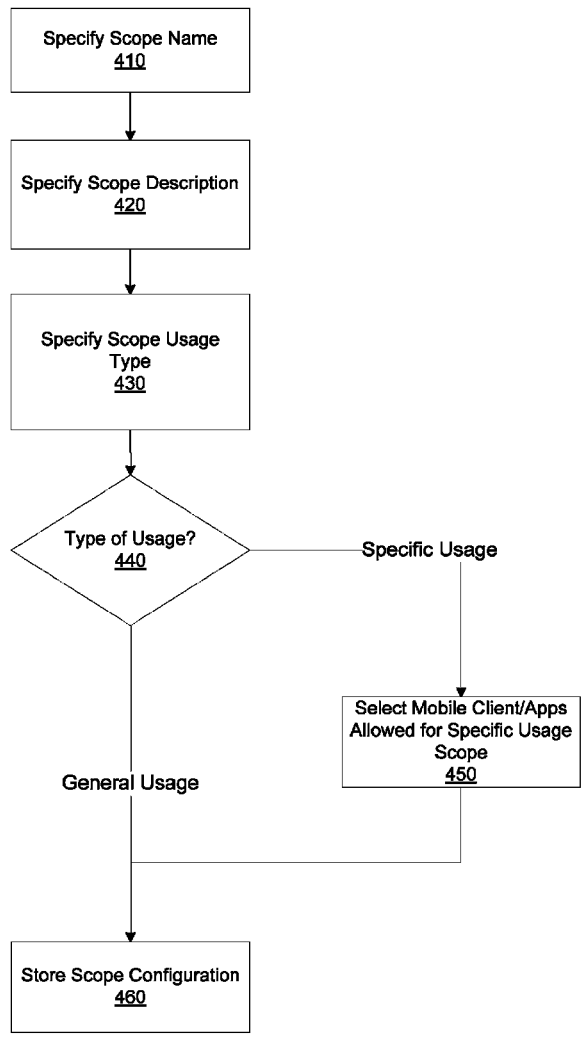

FIGS. 4A and 4B illustrate an exemplary user interface and process for defining client usage scope according to an embodiment.

A user with authorized access, such as a system administrator, may register and configure mobile devices and $3^{rd}$ party apps via the register 132, by for example, using an user interface (UI) 401 as illustrated in FIG. 4A.

According to an embodiment of FIG. 4B, at 410, the process 400 may begin with the user may specify a scope name.

At 420, the user may specify a scope's description.

At 430, the user may specify a scope's usage type.

At 440, the server processor 136 may determine whether the scope usage type is general or specific.

At 450, if the scope usage type is specific, then the user may select specific $3^{rd}$ party apps on specific mobile devices allowed for the specific scope. The specific scope may be configured or created by the user, and then associated with specific $3^{rd}$ party apps on specific mobile devices allowed for the specific scope.

At 460, if the scope usage type is general, or the scope usage type is specific and associated with specific $3^{rd}$ party apps and devices, then the scope usage is defined and the scope usage information may be stored as scope configuration, for example, as part of the profile information in database 134.

As part of authentication/authorization, the register 132 may retrieve all details from database 134 related to the parameters in the request for authorization. This may include expiration details, scopes that were requested when previous authorizations were issued. Based on the previous requested scopes, the server processor 136 may extract the authorized scopes. This calculated list of scopes may be compared against the list of scopes that are part of the new Authorization request. If all requested scopes are within the Calculated Scopes list, then the server processor 136 may allow the new authorization. Otherwise the authorization may fail.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

Figure 5:
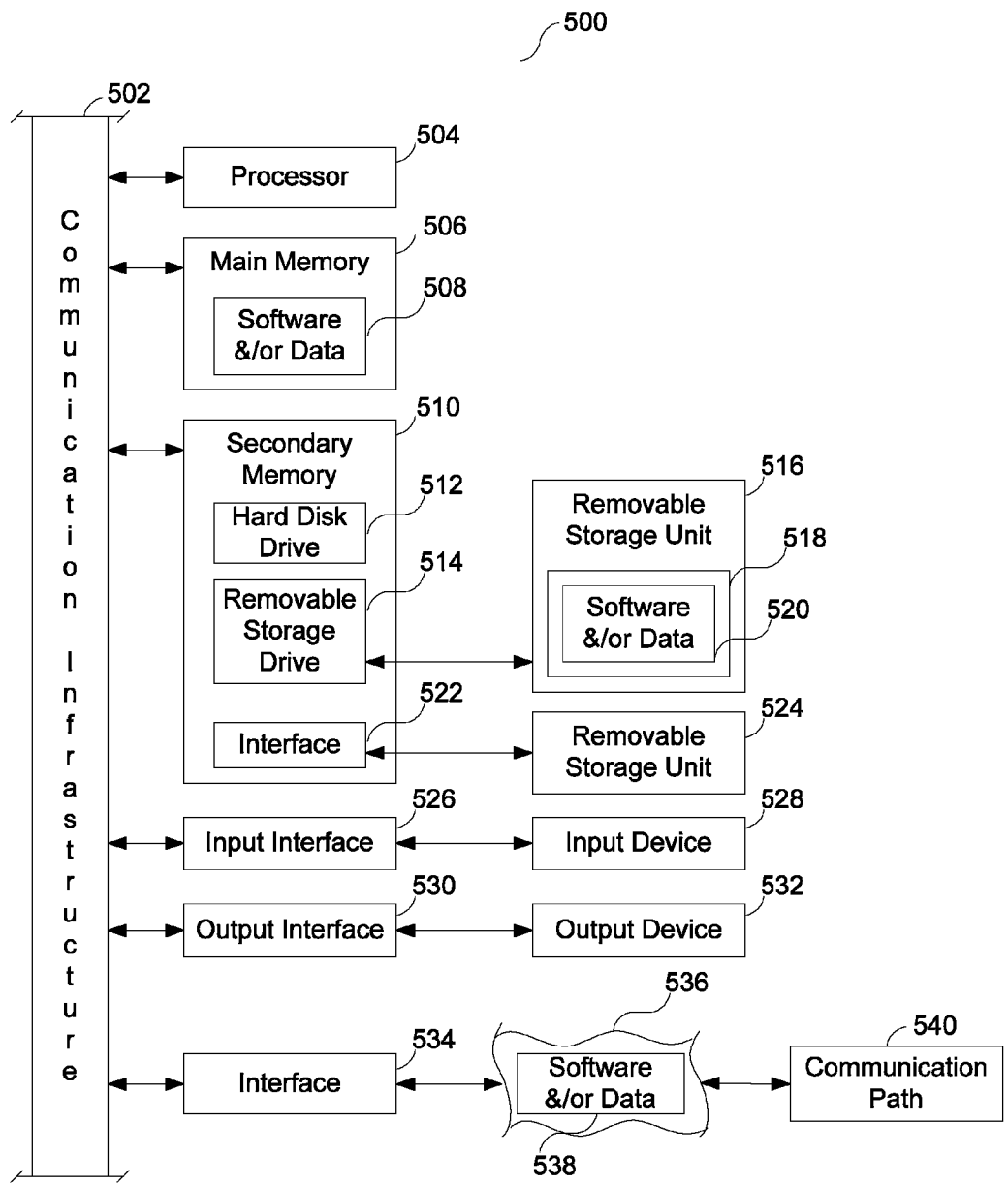
FIG. 5 illustrates an exemplary system according to an embodiment.

Aspects of the above may be implemented by software, firmware, hardware, or any combination thereof. FIG. 5 illustrates an example computer system 500 in which the above, or portions thereof, may be implemented as computer-readable code. Various embodiments of the above are described in terms of this example computer system 500. The client device 110 and the server 130 may each be a computer system 500.

Computer system 500 includes one or more processors, such as processor 504. Processor 504 can be a special purpose processor or a general purpose processor. Processor 504 is connected to a communication infrastructure 502 (for example, a bus or a network).

Computer system 500 also includes a main memory 506, preferably Random Access Memory (RAM), containing possibly inter alia computer software and/or data 508.

Computer system 500 may also include a secondary memory 510. Secondary memory 510 may include, for example, a hard disk drive 512, a removable storage drive 514, a memory stick, etc. A removable storage drive 514 may comprise a floppy disk drive, a magnetic tape drive, an optical disk drive, a flash memory, or the like. A removable storage drive 514 reads from and/or writes to a removable storage unit 516 in a well-known manner. A removable storage unit 516 may comprise a floppy disk, magnetic tape, optical disk, etc. which is read by and written to by removable storage drive 514. As will be appreciated by persons skilled in the relevant art(s) removable storage unit 516 includes a computer usable storage medium 518 having stored therein possibly inter alia computer software and/or data 520.

In alternative implementations, secondary memory 510 may include other similar means for allowing computer programs or other instructions to be loaded into computer system 500. Such means may include, for example, a removable storage unit 524 and an interface 522. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 524 and interfaces 522 which allow software and data to be transferred from the removable storage unit 524 to computer system 500.

Computer system 500 may also include an input interface 526 and a range of input devices 528 such as, possibly inter alia, a keyboard, a mouse, etc.

Computer system 500 may also include an output interface 530 and a range of output devices 532 such as, possibly inter alia, a display, one or more speakers, etc.

Computer system 500 may also include a communications interface 534. Communications interface 534 allows software and/or data 538 to be transferred between computer system 500 and external devices. Communications interface 534 may include a modem, a network interface (such as an Ethernet card), a communications port, a Personal Computer Memory Card International Association (PCMCIA) slot and card, or the like. Software and/or data 538 transferred via communications interface 534 are in the form of signals 536 which may be electronic, electromagnetic, optical, or other signals capable of being received by communications interface 534. These signals 536 are provided to communications interface 534 via a communications path 540. Communications path 540 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 516, removable storage unit 524, and a hard disk installed in hard disk drive 512. Signals carried over communications path 540 can also embody the logic described herein. Computer program medium and computer usable medium can also refer to memories, such as main memory 506 and secondary memory 510, which can be memory semiconductors (e.g. Dynamic Random Access Memory (DRAM) elements, etc.). These computer program products are means for providing software to computer system 500.

Computer programs (also called computer control logic) are stored in main memory 506 and/or secondary memory 510. Computer programs may also be received via communications interface 534. Such computer programs, when executed, enable computer system 500 to implement the present invention as discussed herein. In particular, the computer programs, when executed, enable processor 504 to implement the processes of aspects of the above. Accordingly, such computer programs represent controllers of the computer system 500. Where the invention is implemented using software, the software may be stored in a computer program product and loaded into computer system 500 using removable storage drive 514, interface 522, hard drive 512 or communications interface 534.

The invention is also directed to computer program products comprising software stored on any computer useable medium. Such software, when executed in one or more data processing devices, causes data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Micro-electromechanical Systems (MEMS), nanotechnological storage device, etc.), and communication mediums (e.g., wired and wireless communications networks, local area networks, wide area networks, intranets, etc.).

It is important to note that the particulars of FIG. 5 (such as for example the specific components that are presented, the component arrangement that is depicted, etc.) are illustrative only and it will be readily apparent to one of ordinary skill in the relevant art that numerous alternatives (including inter alia other or different components, alternative arrangements, etc.) are easily possible.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the disclosure may be implemented using Java, C++, or other object-oriented programming language and development tools. Another embodiment of the disclosure may be implemented in hardwired circuitry in place of, or in combination with machine readable software instructions.

A data provider may be an information resource. Data provider may include sources of data that enable data storage and retrieval. Data provider may include databases, such as, relational, transactional, hierarchical, multi-dimensional (e.g., Online Analytic Processing—OLAP), object oriented databases, and the like. Further data provider may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., Enterprise resource planning system), and the like. These data providers can include associated data foundations, semantic layers, management systems, security systems and so on.

A semantic layer is an abstraction overlying one or more data sources. It removes the need for a user to master the various subtleties of existing query languages when writing queries. The provided abstraction includes metadata description of the data sources. The metadata can include terms meaningful for a user in place of the logical or physical descriptions used by the data source. For example, common business terms in place of table and column names. These terms can be localized and or domain specific. The semantic layer may include logic associated with the underlying data allowing it to automatically formulate queries for execution against the underlying data sources. The logic includes connection to, structure for, and aspects of the data sources.

Some semantic layers can be published, so that it can be shared by many clients and users. Some semantic layers implement security at a granularity corresponding to the underlying data sources' structure or at the semantic layer. The specific forms of semantic layers includes data model objects that describe the underlying data source and define dimensions, attributes and measures with the underlying data. The objects can represent relationships between dimension members, and can provide calculations associated with the underlying data.

It is appreciated that the disclosure is not limited to the described embodiments, and that any number of scenarios and embodiments in which conflicting appointments exist may be resolved.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, may be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

The present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "disclosure" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

For simplicity of exposition, the term 'database' was employed in aspects of the above discussion. It will be readily apparent to one of ordinary skill in the art that in the context of the above discussion the scope of that term is not limited just to for example a database management system but rather encompasses inter alia any data source, data model, etc.

In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

We claim:

1. A system comprising:
   at least one data processor; and
   memory storing instructions which, when executed by the at least one data processor, result in operations comprising:
   generating by a mobile client device, an authorization request with a secure token that corresponds to both the mobile client device and to a third party application and which is used to access a server, the authorization request being embedded with a plurality of parameters to allow the server to determine, based upon at least one of the plurality of parameters, if an authorization token should be provided to the mobile client device, the plurality of parameters chosen from a group comprising: a requesting mobile client device, a third-party application, and a scope of usage;
   requesting, by the mobile client device, access to the server by using the authorization token, in response to the authorization request, the server comprising a database and a register, the register storing a plurality of profiles of mobile client devices with respective secure tokens in the database;
   receiving, by the mobile client device, the authorization token if the server determines that the authorization token should be provided to the mobile client device;
   first determining that the secure token is valid by determining that a scope of usage is within a defined security level for the mobile client device and the third-party application;
   second determining, using the register, that the mobile client device and the third-party application are registered in one of the plurality of profiles in the register; and
   providing the mobile client device access to the server based on the first determining and the second determining.

2. The system of claim 1, wherein the secure token is embedded in the authorization request.

3. The system of claim 1, wherein the authorization token is based on a web session identification number.

4. The system of claim 1, wherein the authorization token is based on a time-stamp associated with the authorization request.

5. The system of claim 1, wherein the scope of usage is associated with at least one of data deletion, data modification, data read, data write, and data query.

6. A computer-implemented method comprising:
   generating by a mobile client device, an authorization request with a secure token that corresponds to both the mobile client device and to a third party application and which is used to access a server, the authorization request being embedded with a plurality of parameters to allow the server to determine, based upon at least one of the plurality of parameters, if an authorization token should be provided to the mobile client device, the plurality of parameters chosen from a group comprising: a requesting mobile client device, a third-party application, and a scope of usage;
   requesting, by the mobile client device, access to the server by using the authorization token, in response to the authorization request, the server comprising a database and a register, the register storing a plurality of profiles of mobile client devices with respective secure tokens in the database;

receiving, by the mobile client device, the authorization token if the server determines that the authorization token should be provided to the mobile client device;

first determining that the secure token is valid by determining that a scope of usage is within a defined security level for the mobile client device and the third-party application;

second determining, using the register, that the mobile client device and the third-party application are registered in one of the plurality of profiles in the register; and providing the mobile client device access to the server based on the first determining and the second determining.

7. The method of claim 6, wherein the secure token is embedded in the authorization request.

8. The method of claim 6, wherein the authorization token is based on a web session identification number.

9. The method of claim 6, wherein the authorization token is based on a time-stamp associated with the authorization request.

10. The method of claim 6, wherein the scope of usage is associated with at least one of data deletion, data modification, data read, data write, and data query.

11. A non-transitory computer program product storing instructions which, when executed by at least one data processor forming part of at least one computing device, result in operations comprising:

generating by a mobile client device, an authorization request with a secure token that corresponds to both the mobile client device and to a third party application and which is used to access a server, the authorization request being embedded with a plurality of parameters to allow the server to determine, based upon at least one of the plurality of parameters, if an authorization token should be provided to the mobile client device, the plurality of parameters chosen from a group comprising: a requesting mobile client device, a third-party application, and a scope of usage;

requesting, by the mobile client device, access to the server by using the authorization token, in response to the authorization request, the server comprising a database and a register, the register storing a plurality of profiles of mobile client devices with respective secure tokens in the database;

receiving, by the mobile client device, the authorization token if the server determines that the authorization token should be provided to the mobile client device;

first determining that the secure token is valid by determining that a scope of usage is within a defined security level for the mobile client device and the third-party application;

second determining, using the register, that the mobile client device and the third-party application are registered in one of the plurality of profiles in the register; and providing the mobile client device access to the server based on the first determining and the second determining.

12. The computer program product of claim 11, wherein the secure token is embedded in the authorization request.

13. The computer program product of claim 11, wherein the authorization token is based on a web session identification number.

14. The computer program product of claim 11, wherein the authorization token is based on a time-stamp associated with the authorization request.

15. The computer program product of claim 11, wherein the scope of usage is associated with at least one of data deletion, data modification, data read, data write, and data query.

* * * * *